United States Patent
Stratton et al.

(10) Patent No.: US 10,779,017 B2
(45) Date of Patent: Sep. 15, 2020

(54) METHOD AND SYSTEM FOR REDUCING DROP-OUTS DURING VIDEO STREAM PLAYBACK

(71) Applicant: WARNER BROS. ENTERTAINMENT INC., Burbank, CA (US)

(72) Inventors: Tom Stratton, Los Angeles, CA (US); Shaun Lile, Burbank, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 16/214,921

(22) Filed: Dec. 10, 2018

(65) Prior Publication Data
US 2020/0186849 A1 Jun. 11, 2020

(51) Int. Cl.
| | | |
|---|---|---|
| G06F 15/16 | (2006.01) |
| H04N 21/234 | (2011.01) |
| H04N 21/2381 | (2011.01) |
| H04L 29/06 | (2006.01) |
| H04N 21/44 | (2011.01) |

(52) U.S. Cl.
CPC ..... H04N 21/23406 (2013.01); H04L 65/601 (2013.01); H04L 65/607 (2013.01); H04N 21/2381 (2013.01); H04N 21/44004 (2013.01)

(58) Field of Classification Search
CPC ......... H04N 21/23406; H04N 21/2381; H04N 21/44004; H04L 65/601; H04L 65/607
USPC ........................................................ 709/231
See application file for complete search history.

(56) References Cited

U.S. PATENT DOCUMENTS

| | | | | | |
|---|---|---|---|---|---|
| 4,518,996 A | * | 5/1985 | Reitmeier | ............... | H04N 5/935 348/500 |
| 5,568,139 A | * | 10/1996 | Yoon | ..................... | H03M 7/425 341/67 |
| 5,953,338 A | * | 9/1999 | Ma | ...................... | H04L 12/5602 370/377 |
| 6,594,798 B1 | | 7/2003 | Chou et al. | | |
| 7,075,990 B2 | * | 7/2006 | Costa | ................. | H04N 21/2343 375/240.24 |

(Continued)

OTHER PUBLICATIONS

Invitation to Pay Additional Fees and, Where Applicable, Protest Fee (PCT Article 17(3)(a) and Rules 40.1 and 40.2 (e)) dated Feb. 11, 2020 issued in International Application No. PCT/US19/65355.

(Continued)

*Primary Examiner* — Melvin H Pollack
(74) *Attorney, Agent, or Firm* — Gottlieb, Rackman & Reisman, P.C.

(57) ABSTRACT

An improved video streaming method and system that reduces video stream playback dropouts when video data flow from a server is degraded or interrupted. Two adaptive bitrate video streams of the content are operated in parallel with video quality that can be adjusted independently. The first stream receives data blocks at a rate generally concurrent with the video playback. The second stream receives data blocks in advance of the playback point and these blocks are buffered. The best available block is used during playback. Buffered second stream blocks can be used to continue playback when the network connection is compromised or interrupted.

24 Claims, 6 Drawing Sheets

(56) References Cited

U.S. PATENT DOCUMENTS

| | | | |
|---|---|---|---|
| 7,346,698 B2* | 3/2008 | Hannaway | H04N 21/23406 348/14.07 |
| 9,544,665 B2* | 1/2017 | Mamidwar | H04N 21/23439 |
| 10,063,404 B2* | 8/2018 | Holley | H04N 21/2401 |
| 10,178,140 B2* | 1/2019 | Reznik | H04L 65/60 |
| 10,270,823 B2* | 4/2019 | Stockhammer | H04L 65/607 |
| 10,291,680 B2* | 5/2019 | Radha | H04L 65/607 |
| 10,310,928 B1* | 6/2019 | Hegar | H04L 43/0823 |
| 10,341,660 B2* | 7/2019 | Tanizawa | H04N 21/23432 |
| 10,389,780 B2* | 8/2019 | Eshet | H04L 65/4084 |
| 10,390,071 B2* | 8/2019 | Sethuraman | H04N 21/8456 |
| 10,405,274 B2* | 9/2019 | Narayanan | H04L 67/04 |
| 10,439,910 B2* | 10/2019 | Koster | H04L 65/80 |
| 10,440,082 B1* | 10/2019 | Winston | H04L 65/608 |
| 10,469,859 B2* | 11/2019 | Li | H04N 19/176 |
| 10,506,014 B2* | 12/2019 | Spilka | H04L 65/601 |
| 10,523,727 B2* | 12/2019 | Sehgal | H04L 65/4092 |
| 2006/0050780 A1 | 3/2006 | Cooper et al. | |
| 2007/0101378 A1 | 5/2007 | Jacobs | |
| 2011/0225302 A1 | 9/2011 | Park et al. | |
| 2013/0007200 A1* | 1/2013 | van der Schaar | H04L 47/12 709/217 |
| 2015/0206068 A1* | 7/2015 | Davidovich | G06N 20/00 706/12 |
| 2016/0105689 A1 | 4/2016 | Sörlander et al. | |
| 2017/0251033 A1* | 8/2017 | Huysegems | H04L 67/26 |
| 2019/0098343 A1* | 3/2019 | Knecht | H04N 21/23103 |
| 2019/0166391 A1* | 5/2019 | Park | H04N 21/23437 |
| 2019/0289049 A1* | 9/2019 | Andersson | H04L 65/80 |
| 2019/0306551 A1* | 10/2019 | Arye | H04L 65/601 |
| 2019/0327505 A1* | 10/2019 | Schwimmer | H04N 21/2393 |
| 2019/0349630 A1* | 11/2019 | Stockhammer | H04N 21/4307 |
| 2019/0364330 A1* | 11/2019 | Moroney | H04N 21/433 |
| 2020/0014944 A1* | 1/2020 | Zhang | H04N 19/40 |
| 2020/0014953 A1* | 1/2020 | Mammou | H04N 19/463 |
| 2020/0037045 A1* | 1/2020 | Mahvash | H04N 21/8456 |

OTHER PUBLICATIONS

International Search Report, US Patent and Trademark Office, Application No. PCT/US20198/065355, dated Apr. 23, 2020.

Written Opinion of the International Searching Authority, US Patent and Trademark Office, Application No. PCT/US20198/065535, dated Apr. 23, 2020.

* cited by examiner

PRIOR ART

FIG. 1A

PRIOR ART

METHOD AND SYSTEM FOR REDUCING DROP-OUTS DURING VIDEO STREAM PLAYBACK

FIELD OF THE INVENTION

The present invention is directed to methods and systems for streaming video from a server, and particularly is directed to an improved video streaming method and system that reduces video stream playback dropouts when video data flow from the server is degraded or interrupted.

BACKGROUND

It is common for users of computer devices, such as cell phones, tablets, laptop computers, and other smart devices to download video files over the internet. In a simple option, the entire video file is downloaded to the user's device and then played. Video files can be extremely large. Downloading the complete file in advance may take an unreasonable amount of time and consume a large amount of network resources. Memory constraints on the user's device may also prevent storage of the full video file making download impossible.

To address these issues, many providers offer their video content available as streaming media which allows the video to be viewed in real or near-real time as it downloads. Streaming video content is made available as a sequence of sequentially arranged blocks (sometimes referred to as chunks or segments), containing encoded video data of a predefined number of frames. Each block typically contains about 2 to 10 seconds of playable video. Player software loaded on the user's device sequentially requests the streaming media from a server, typically at a rate which corresponds to the rate blocks are played black by the player. The player software will typically buffer one or a small number of blocks before starting playback.

Conventional streaming software uses a variation of this process known as adaptive or variable bitrate streaming (VBR). In a VBR streaming system, the media provider encodes the encoded video data in multiple layers, each having a different bit rate reflecting the quality of the video in that layer. A video asset manifest file can be provided by the server to indicate the different bit rate video layers available for a given video. The player on the user's device monitors the local conditions, such as the network connection speed and possibly other factors that impact the maximum supportable streaming. When a next video block is needed, the player requests the quality block from a video layer that has been encoded with a bit rate appropriate for the current conditions, such as the maximum bit rate block that can be requested and still arrive before it is needed. As the speed of the network connection varies, such as due to network congestion or movement by a user connected over a wireless link, a VBR streaming video player can adjust the bit rate quality being used. As a result, players with fast and slow connections, such as a wired internet versus WiFi or a cellular data link, are better able to stream the video to their device for viewing in real time even as the network bandwidth and other system resources that impact block delivery and processing time vary.

When video is streamed from a central server to a remote playback device or software player, it is common for the data connection periodically be degraded or fully interrupted for short periods of time due to, e.g., changes in a local network connection quality, intervening network lag, or other factors. Conventional VBR technology can respond to these issues to some degree by requesting reduced bit rate blocks of video as noted above. However, the process is reactive in nature and adjustments apply only to the next block in the video to be requested. If a high quality block is selected and then the network connection is compromised, the requested block may not be received in time and this can result in a freeze of the video or other dropout effects while the player software recovers, such as by restarting the video stream at a lower bit rate.

These temporary interruptions can distract and frustrate viewers and also increase the chance that the viewer decides to stop watching the video all together. In addition to impacting the viewer experience, this can also impact the media provider, particularly in situations where the video includes advertising or similar content that generates revenue based on the number of people who watch it. When the video streaming software is specific for a given media provider, the user may also develop a negative impression of the overall quality of service provided by that company even if the network issues are due to local conditions and not under control of the media provider.

There is a need for improved streaming video player functionality that can better respond to degradation or full interruption of data flow during streaming playback. There is a further need for improved streaming video player functionality that reduces and in many cases can eliminate the number and/or duration of playback interruptions as a result of data flow degradation and interruptions.

SUMMARY

These and other problems are resolved by the various embodiments of an improved method and system for streaming video as disclosed herein and which can be implemented as an extension to conventional streaming protocols.

According to an embodiment, the method and system uses at least two video streaming processes that operate generally in parallel with each other. Both obtain streams of video data blocks for the same video content from a server. The first streaming process requests sequential blocks of video data and can request the blocks at a rate commensurate with the rate at which blocks are played back. The second streaming process is operated so that the second stream runs ahead of the first stream to obtain advance blocks which are then stored in a buffer. The video player switches playback to buffered data from the second stream in the event that the data flow from the server is compromised to thereby allow the video playback to continue without interruption.

The second stream can be started at a sequence number ahead of the starting sequence number for the first stream. In addition or alternatively, the second streaming process can be configured to request blocks from the server more quickly than blocks are requested by the first streaming process to thereby allow a buffer of advance second stream blocks to be filled.

The system can access video that is encoded in layers having different bit rates and the streaming processes be configured to request blocks from the server at one or more of the available bit rates. The second streaming process can be started at a lower bit rate than the first so that the data blocks are retrieved more quickly for the second stream relative to the first stream. To increase the number of advance second stream blocks available in the buffer during video playback, the bit rate used by the second stream can be adjusted down. If there are enough advance second stream blocks in the buffer, the bit rate for the second stream can be increased to increase quality of the video in later obtained stream two blocks. If a maximum number of advance second stream blocks is available in the buffer, the second streaming process can temporarily stop requesting blocks from the server.

The bit rate used by the first stream can be adaptively adjusted to respond to current conditions and/or available system resources and set to a maximum supportable bit rate at any given time. According to an embodiment, before the first streaming process requests a given block at a particular bit rate, it checks to see whether a corresponding block having the same sequence number has already been buffered and, if so, only issues the request if the particular bit rate is greater the bit rate of the buffered stream-two block. After the higher bit rate block is received in stream one, the corresponding lower quality stream-two block in the buffer can be deleted.

When a block at a particular sequence number is needed for playback, the block can be selected from the first stream or a buffered stream two block. According to one embodiment, if the block needed for playback is not available from the first stream, such as may occur when the data connection is temporarily compromised, the stream-two block with the appropriate sequence number is taken from the buffer. If both stream-one and stream-two blocks are available for the particular sequence number, the block with the highest quality can be selected. If no bandwidth is available, the system can pick and play the best available block from the first or the second stream until there are no remaining blocks to play. During this time, the streams can be attempting to reestablish connection with the network. When connection is reestablished, stream one can restart at the next block after the one currently being played and stream two can start at an advance block, such as the last available block+1 or treat the situation the same as the start of streaming.

BRIEF DESCRIPTION OF THE FIGURES

These and other features and advantages of the invention, as well as structure and operation of various implementations of the invention, are disclosed in detail below with references to the accompanying drawings, in which.

DETAILED DESCRIPTION OF VARIOUS EMBODIMENTS

Figure 1A:
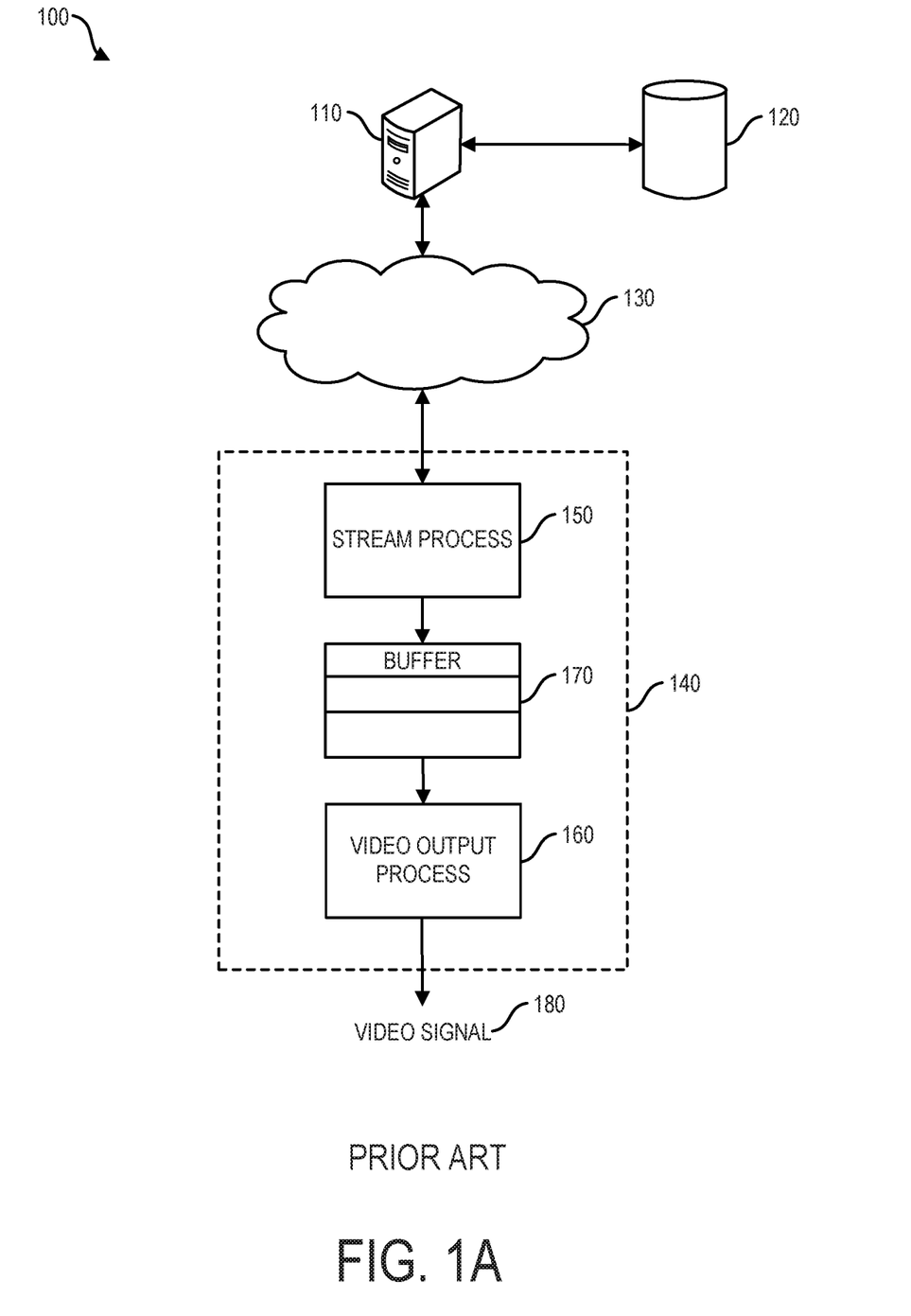
FIG. 1A is a high level block diagram of a conventional VBR streaming system.

FIG. 1A is a high level block diagram of a conventional streaming system 100. A streaming video server 110 has access to a video media file storage 120 where the video files have been rendered into blocks suitable for streaming. The server 110 is connected to a network 130, such as the Internet. A streaming video player application 140 can be executed in a user's computing device (not shown). The player application 140 includes a streaming process 150 that retrieves streamed media blocks from the server 110 and a video output process 160 that contains the codec and other functionality to process data contained in the received streamed blocks and generate an output video signal or other decoded video data 180 that can (with further intervening software and hardware as appropriate) be shown on the user's device. A buffer 170 can be provided to store streamed blocks that are received in advance of when they need to be played. In order to limit network traffic, conventional streaming video players typically request only one block in advance of the block being played.

Figure 1B:
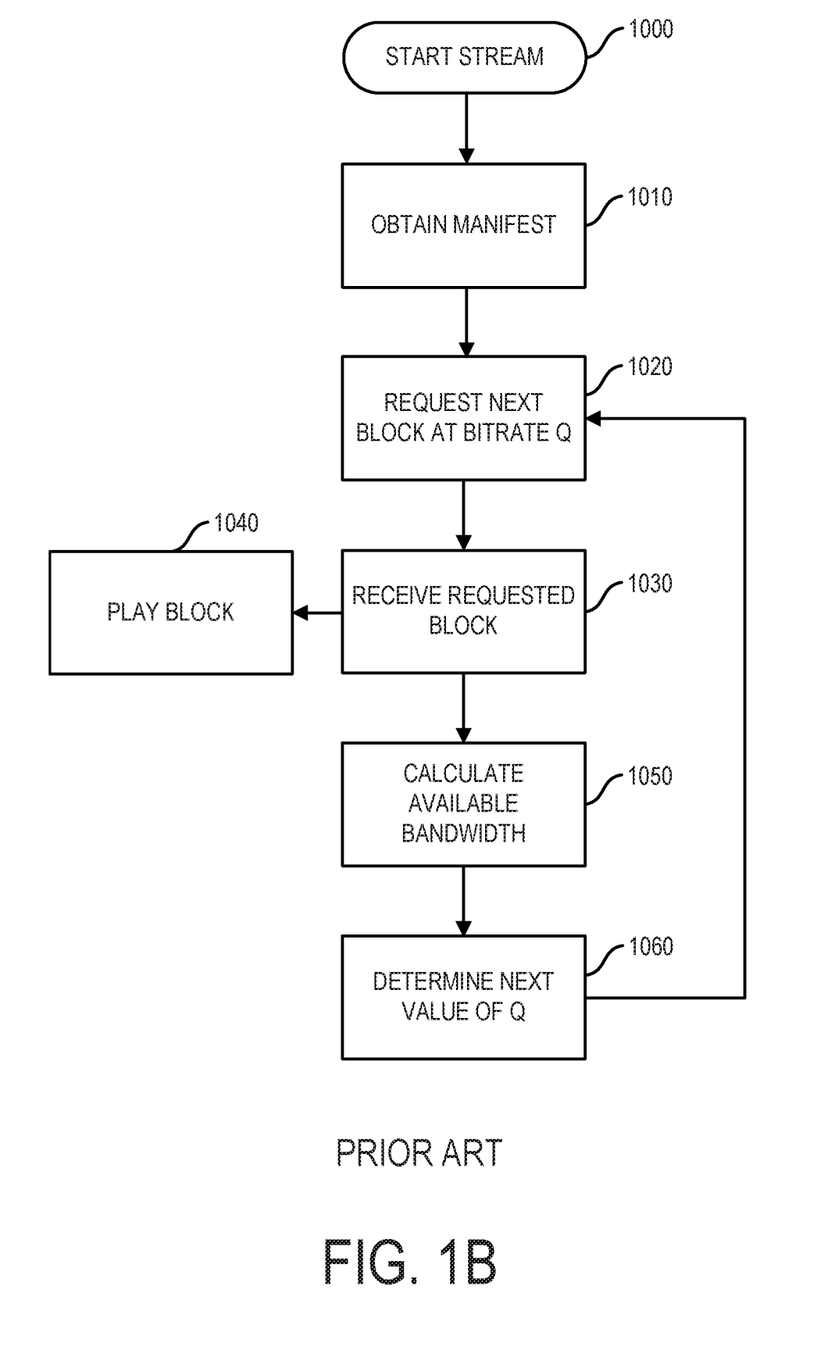
FIG. 1B is a basic flowchart illustrating aspects of a conventional VBR streaming process.

FIG. 1B is a basic flowchart illustrating aspects of a conventional VBR streaming process. When a user wants to view a streaming video, a streaming process is initiated and initial requests to start a video stream are sent to the server. (Step 1000). An asset manifest file detailing the different bit rate layers and blocks available for the video and provided by the server may be initially obtained. (Step 1010). The player determines a starting video quality bit rate Q based, e.g., on available resources, or alternatively can start from a default or selected value (e.g., a high bitrate for wired internet, a medium bitrate for WiFi, and a low bitrate for a cell phone network connection).

The player requests and receives a video block having a sequence number N (hereafter referred to as block N) and at the selected bitrate Q. Block N is received (step 1030) and provided to the video output process 160 where it decoded as appropriate and then played for the user (step 1040). The player can then reassess the available bandwidth (which may include consideration of factors such as the data link from the computing device and lag in the network between the computing device and the remote server) and other system resources. (Step 1050). A currently supportable value of Q is then determined. (Step 1060). If the available resources will support a video block download that exceeds the current quality bitrate Q by an amount large enough to support a higher quality video stream the value of Q might increase. Likewise, if the available system resources are insufficient to support the current video stream rate, bitrate Q would be decreased to a lower rate available for the video stream provided by server 110. The next block in the streaming video is then requested at the (possibly adjusted) bitrate Q (step 1020) and the process repeats. A wide variety of adaptive video streaming protocols are available that operate in this general manner.

Figure 2:
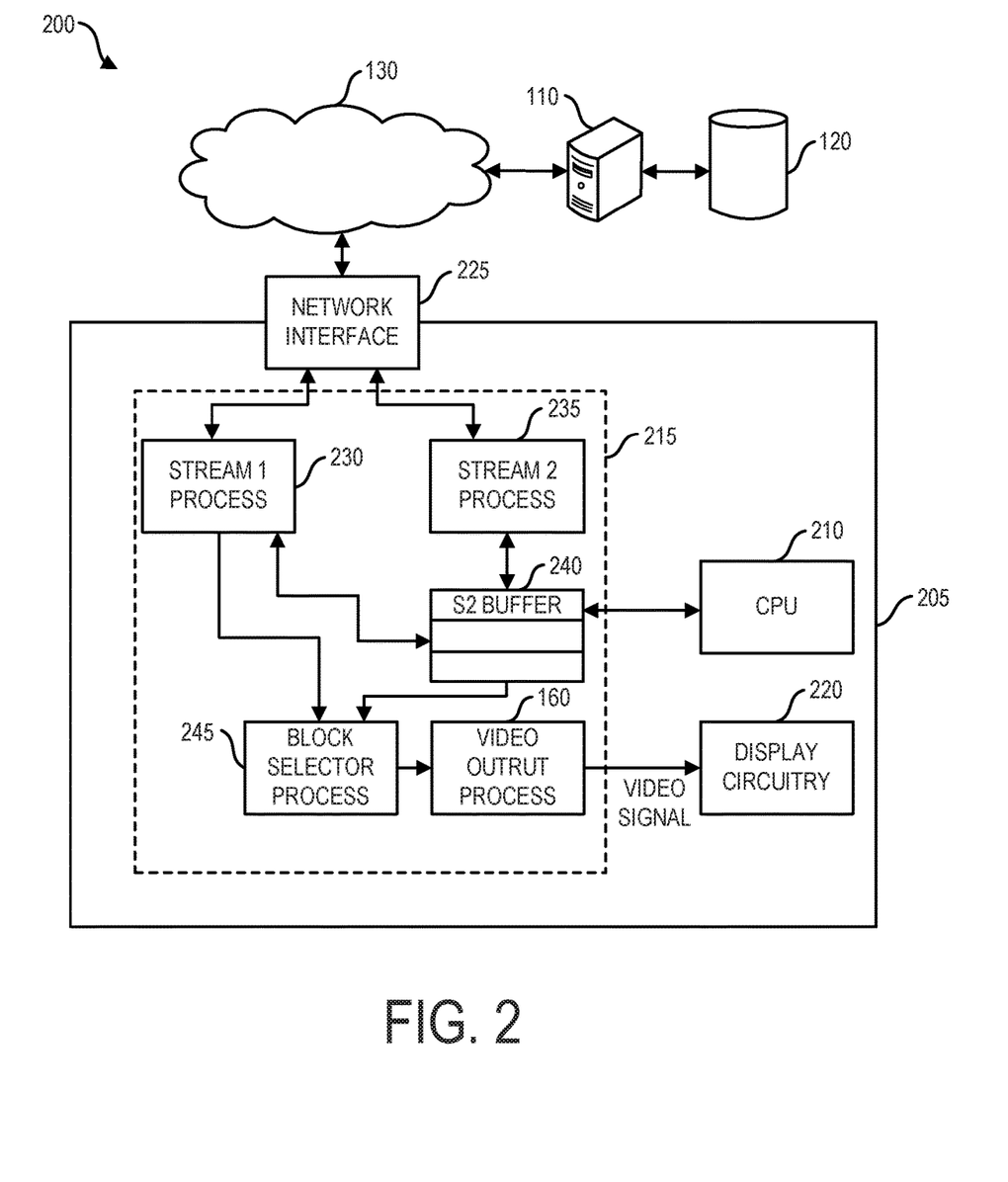
FIG. 2 is a high-level diagram of an embodiment of a computing device 200 with an improved streaming video player 215 according to an embodiment.

FIG. 2 is a high-level diagram of an embodiment of a computing device 200 with an improved streaming video player 215 according to aspects of the present invention. The system 200 can be implemented in software, firmware, and/or hardware of a conventional computing device 205, such as a desktop, laptop or tablet computer, a smart device such as a cell-phone, or other computing device. The computing device 205 has a processor 210 and a memory in which the software and data for player 215 is stored. Video is output on a display of the computing device 200 using appropriate display circuitry 220. A network interface 225 can be used to access video streaming server 110 through network 130.

According to one embodiment, when a streaming video is to be played, the player software 215 initiates two or more separate streaming processes using a designated video streaming protocol and including a primary or first streaming process 230 and a secondary or second streaming process 235. From the perspective of server 110, the first streaming process 230 and the second streaming process 235 would appear to be independent of each other and so treated as such.

As addressed in more detail below, the first streaming process 230 operates to request and receive video blocks from the server 110 for a given video (first stream) and to make those blocks available for playback on the device 205 in real or near real time. Blocks in the first stream are referred to herein as stream-one blocks.

Generally in parallel, the second streaming process 235 operates to stream the same video (but in a second stream) and stores received video blocks in a buffer 240. Blocks in the second stream are referred to herein as stream-two blocks. The second streaming process 235 is configured so that the second stream runs ahead of the first stream and the process attempts to fill the buffer with at least a minimum number M of stream-two blocks ahead of the sequence number for the current playback point of the first stream. For example, if the first streaming process is operating to receive a block N (e.g., a stream one block with sequence number N) from the server, the second streaming process will work to maintain a stream position at a sequence number>=N+M. A stream-one block retrieved by the first streaming process 230 may have the same or different encoding bitrates as a stream-two block with the same sequence number and retrieved by the second streaming process 235.

As discussed further below, block selector 245 is used to select blocks for playback by the video output module 160. In the event that data flow for the first stream is interrupted, the block selector 245 can switch playback to buffered data from the second stream.

The second streaming process 235 can be configured to keep the second stream ahead of the first stream in various ways. The second streaming process 235 can start the second stream generally simultaneously with the first stream but begin playback at a sequence number ahead of the starting sequence number for the first stream. The second streaming process 235 can request blocks for the second stream at a lower quality than being requested for first stream so that video blocks can be received more quickly. The second streaming process 235 can also request blocks more rapidly than the first streaming process 230 (which will, in a typical embodiment, request blocks at the same rate at which they are played). Combinations of these can also be used and alternative techniques may be used as well.

Preferably, an adaptive streaming protocol is used for each of the streams. In addition, the system can be responsive to user preference and optimize use of bandwidth between the streams to prioritize uninterrupted viewing, prioritize maximum video quality, or operate at a selected intermediate setting.

While the second stream buffer 240 is preferably used as a source of playable content for when the data connection is compromised, buffered stream-two blocks may also be used as a source of preview data for scrubbing content. In contrast to conventional scrubbing, which displays video frames at spaced intervals, such as a three or 10 second hop, the buffered stream-two blocks may be used as a source for poster frames when a user scrubs the video and advantageously enable real-time scrubbing of the video. If the buffer is sufficiently large, it may be used to provide a complete backup of the video content.

The system may also be modified to utilize more than two streams to provide protection against longer data stream interruptions. In a particular configuration, a third stream can be started and blocks from that stream buffered. Preferably, the third stream is set to a lower quality than generally used for the first stream and the second stream and could be set to the lowest quality bitrate available and configured to retrieve blocks as quickly as possible within resource constraints. Buffered stream-three blocks can be used as a source of video data for real-time scrubbing as well as a backup video source to avoid playback interruption for an outage longer than the playback period provided by buffered second stream blocks.

Figure 3:
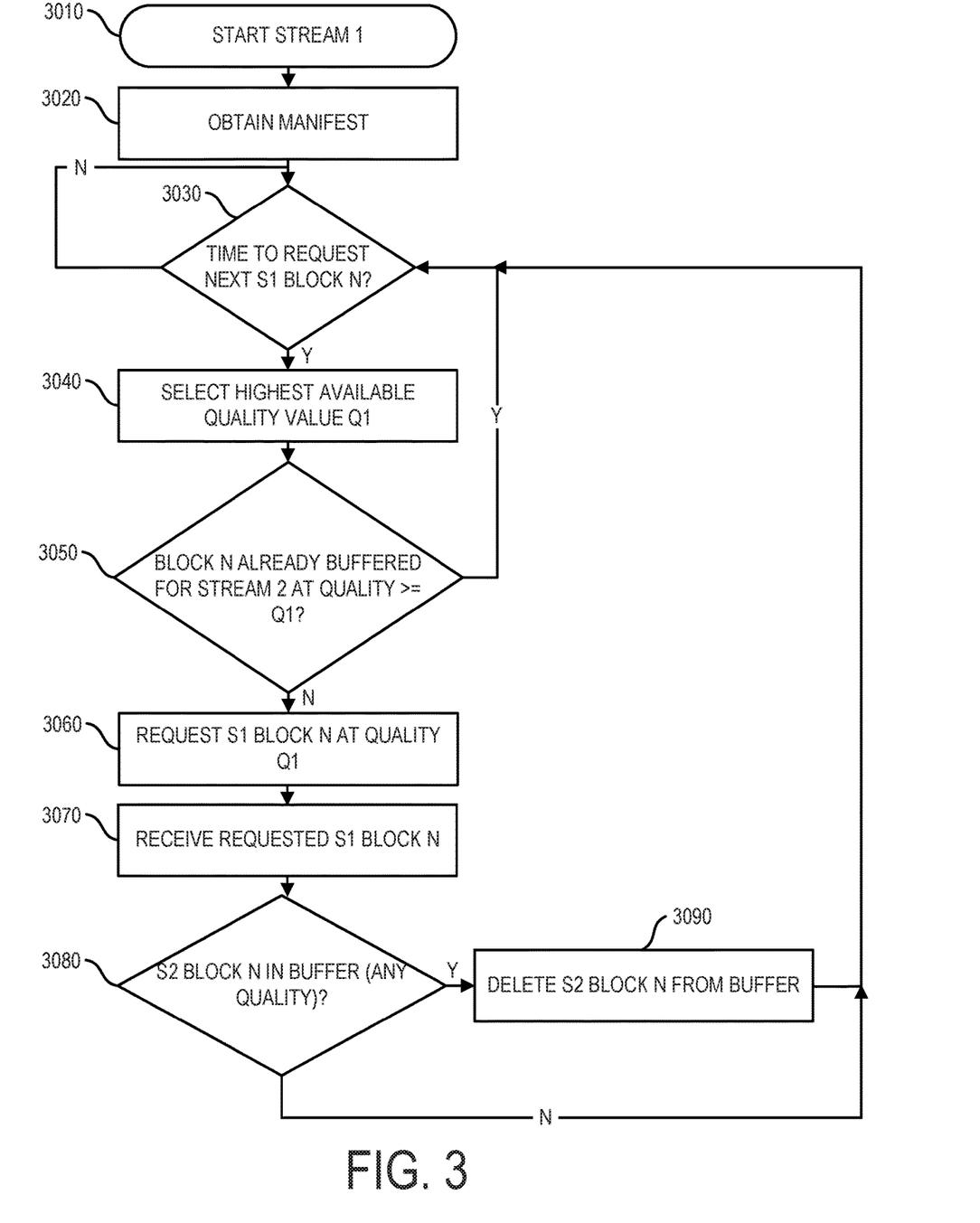
FIG. 3 is a flowchart of operation of a first streaming process according to an embodiment.
Figure 4:
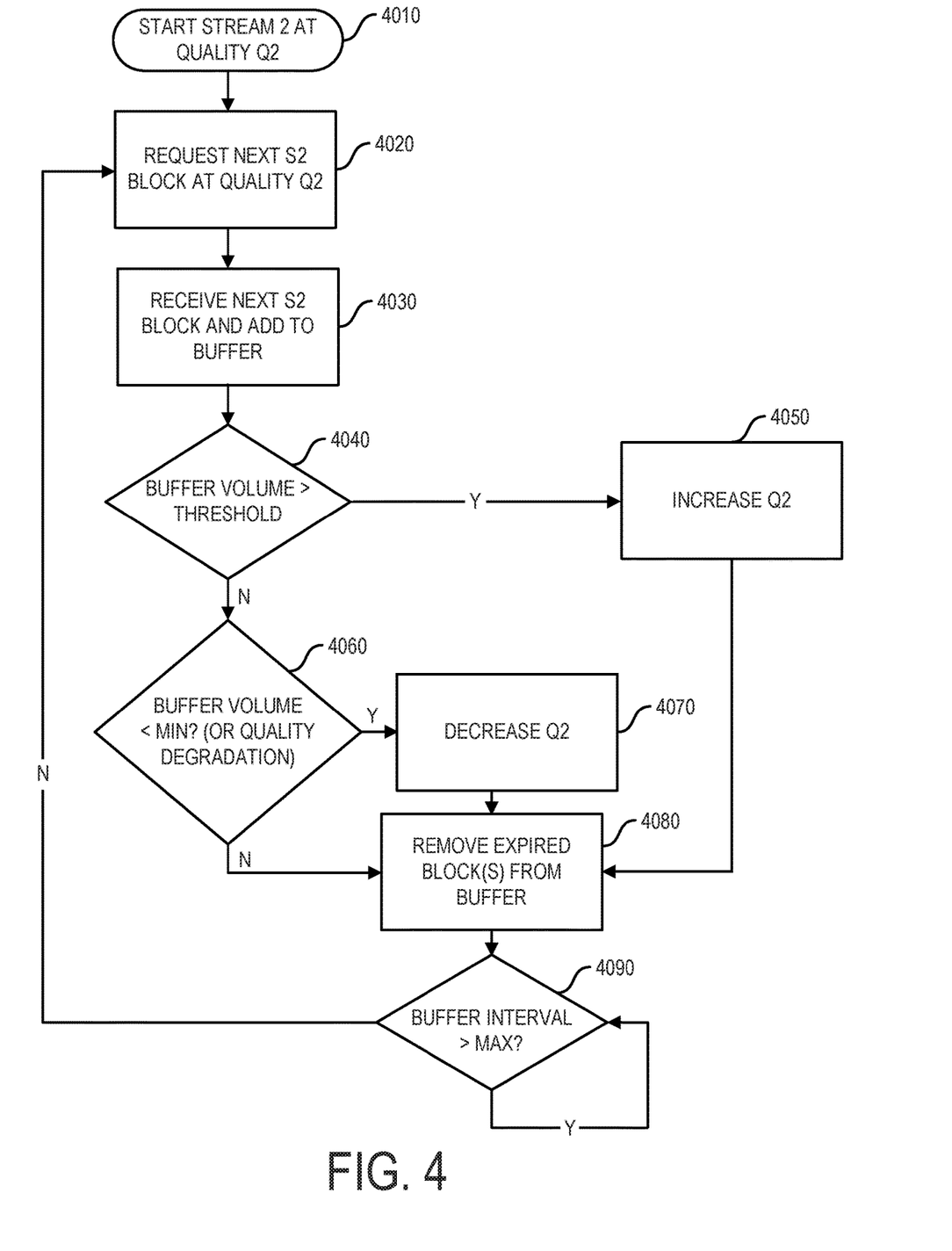
FIG. 4 is a flowchart of operation of a second streaming process according to an embodiment.
Figure 5:
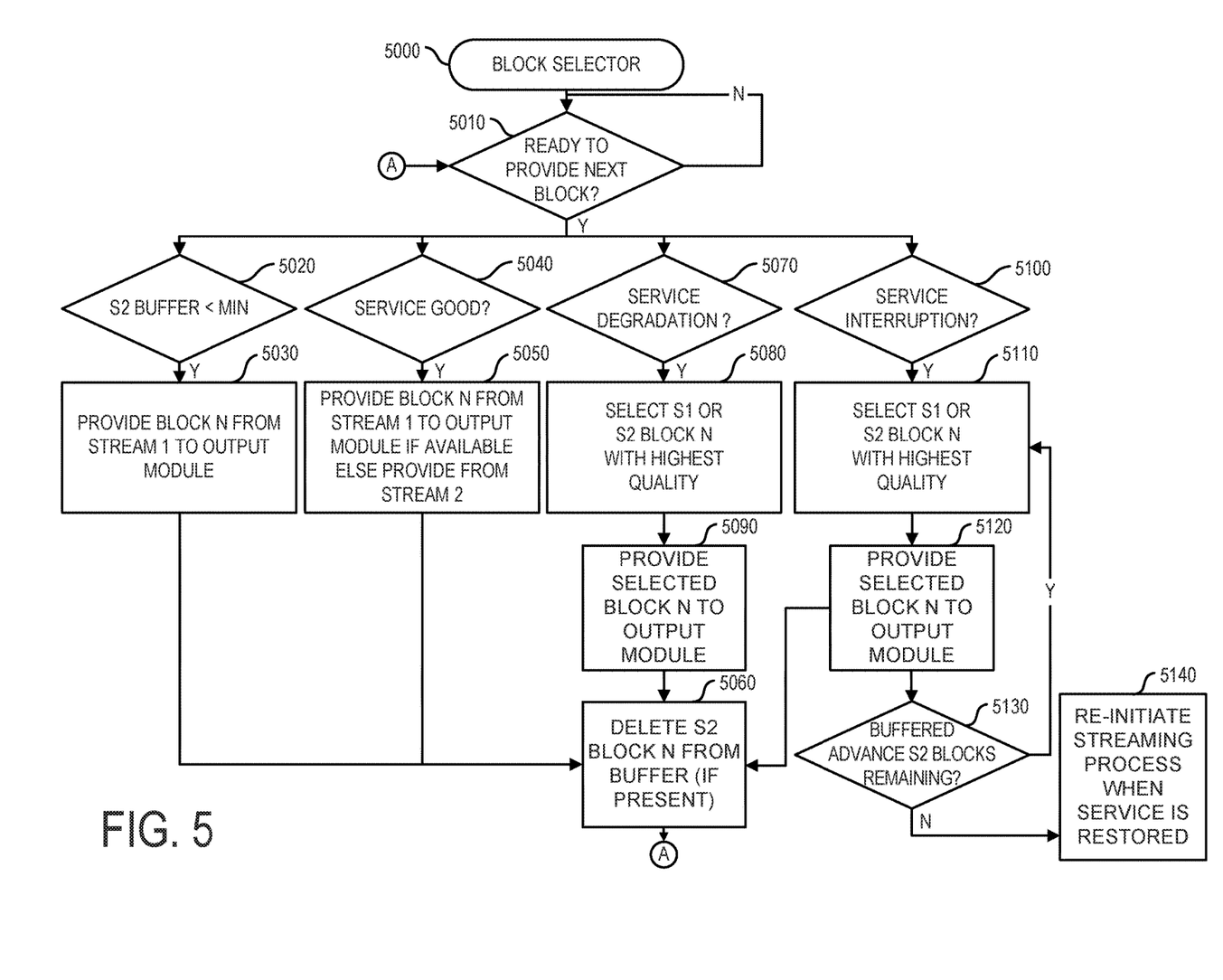
FIG. 5 is a flowchart of operation of a block selection process according to an embodiment.

FIGS. 3-5 are flowcharts showing the high-level operation of the first streaming process 230, the second streaming process 235 and the block selector process 245, respectively, for a VBR adaptive streaming process according to embodiments of the invention.

Turning to FIG. 3, the first streaming process 230 initiates the process of streaming a particular segmented video from the server 110 in accordance with the VBR streaming protocol being used. (Step 3010). In some protocols, a manifest that specifies the video blocks and bit rates available can be obtained at the start of the streaming process (step 3020) and possibly at periodic intervals during streaming. Streaming server 110 provides the video in layers encoded in different bit rates so that a particular sequence number block of a particular bit rate can be requested on demand.

Blocks for the first stream can be requested generally at the same rate as blocks are played back, e.g., on the device 205. For example, if a block contains 10 seconds of playable video, first stream blocks can be requested every 10 seconds.

When it is time to request the next block in the first stream, such as a block N (step 3030), a determination is made about the highest quality Q1 block available from the server that can be retrieved prior to the time it is needed for playback given current resource constraints. (Step 3040). Q1 thus represents the encoded video layer from which the block with sequence number N will be requested for the first stream. The quality selection can consider conventional resource factors, such as the available bandwidth on the network connection and network lag as well as other factors such as processor load.

In addition, and according to one embodiment, the bandwidth available to the streaming processes can be allocated between the first streaming process and the second streaming process according to user preferences for playback quality versus resilience to interruption. In one configuration, a portion of the available bandwidth allocated to second stream can be set from 0 to 50% with a 0% allocation representing the case where second stream is not downloaded at all (since it has no allocated bandwidth) and 50% representing the case where second stream gets half the bandwidth available for the overall streaming process to provide a configuration where playback interruption is given as much priority as playback quality. When the first streaming process is started, its proportional bandwidth allocation can be passed as a parameter and used as a factor thereafter when adjusting the value of Q1. The bandwidth allocation can be fixed during a given video playback session or the user may be allowed to adjust the bandwidth allocation during playback.

Prior to requesting a block N, the first streaming process 230 determines if a corresponding stream-two block N has already been retrieved and stored in the buffer 240 by the second streaming process 235. If the buffer 240 contains a corresponding block N at the same or a higher quality than the selected quality Q1 then no request for block N is made to the server and the process returns to waiting until it is time to request the next block N+1 in stream 1. (Step 3050). Otherwise a request is made to retrieve block N at the determined bitrate quality Q1. (Step 3060). Sometime later, the first streaming process will receive the requested block N (3070). After first stream block N is retrieved, if there is any matching second stream block N in the buffer 240 (which, if present, is expected to be of a lower quality than the received block N in stream 1), the second stream block N is deleted from the buffer. (Steps 3080, 3090). Stream-one block N is then available for playback as appropriate.

Turning to FIG. 4, the second streaming process 235 initiates the process of streaming the segmented video from the server 110 in accordance with the VBR streaming protocol being used. (Step 4010). (A separate manifest can be obtained or the manifest obtained by the first streaming process 230 may be used instead.) The stream is preferably started at a bitrate encoding quality Q2 that is lower than the initial setting of Q1 so that second stream blocks can be downloaded faster than blocks for stream one and advance stream-two blocks can accumulate in the buffer. The next stream two block is requested at the Q2 bitrate. (Step 4020). The starting sequence number of the second stream can be the same as that for the first stream. Alternatively, the second stream can be started at sequence number ahead of the starting sequence number for the first stream. When the requested second stream block is received it is added to the buffer. (Step 4030).

Over time, advance stream-two blocks will accumulate in the buffer 240 and contain video content further along in the video stream than is currently being played and further along than content that has been received through the first stream. When the number of advance second stream blocks in the buffer 240 exceeds a threshold number of blocks ahead of stream one, such as a number of blocks to provide 1, 2, or 5 minutes of playable video or more (step 4040), the bitrate quality Q2 can be increased since the second stream blocks do not need to be retrieved as quickly. (Step 4050). If the number of advance stream-two blocks in the buffer 240 drops below a minimum relative to the position of the first stream (which minimum may be the same as the threshold or a lower value) (step 4060), the bitrate quality Q2 is decreased so that the second stream blocks can be retrieved faster to refill the buffer 240.

Increases and decreases to the value of Q2 can be dependent on additional conditions as well. For example, after the value of Q2 is changed, a further change to Q2 may be blocked until at least a certain number of additional blocks at that new value of Q2 have been received by the second streaming process. Thus, the value of Q2 can be increased or decreased in response to a predefined condition that is dependent on the difference between the largest sequence number among buffered stream-two blocks and the current sequence number for the first stream and may also be dependent on other factors. One such additional factor can be a minimum number of blocks that must be requested after a change to Q2 before Q2 can be changed again.

The second streaming process continues by requesting the next stream-two block needed in the sequence. Even at the highest quality setting, it is possible that the second stream will continue to load blocks faster than the playback rate such that the volume of buffered advanced stream-two blocks available continues to increase. Once the buffer 240 contains second stream blocks for a portion of the video that extends in advance of the first stream position by a maximum amount, such as blocks containing 1, 2, or 5 minutes of video in advance of a playback point or the position of the first stream, the second streaming process can stop requesting additional blocks and instead idle until the amount of advance buffered stream-two blocks falls below the threshold. (Step 4090).

In the illustrated embodiment, blocks that have been output by the player are deleted from the second stream buffer 240 as a matter of course (see discussion of FIG. 3 and also FIG. 5 below). However, there may be situations where the buffer 240 contains old second stream blocks that are no longer needed. If such a situation may occur, expired blocks can be removed from the buffer 240 as needed. (Step 4080). Expired block conditions may occur in an alternative embodiment where instead of deleting a second stream block N from the buffer 240 after a block N is downloaded in first stream (FIG. 3, step 3090) or a block N (from first stream or stream 2) is otherwise played (see FIG. 5), a reserve of old stream-two blocks can be retained in the buffer 240 to provide access to a period of video preceding the current playback point. For example, second stream blocks containing 1, 2, or 5 minutes of video or more prior to the current playback point can be retained. These older buffered blocks can be accessed if the user wants to rewind the video to an earlier period. Many video players, for example, include a hot button that will automatically jump the video back 15 or 30 seconds. The buffered stream-two blocks permit playback to immediately start at the earlier position without having to wait for the first streaming process to request and download stream-one blocks at the new playback position.

Turning to FIG. 5, a method for block selection by the block selector process 240 according to one embodiment is illustrated. The block selection process is initiated when a next block to play is required, e.g., to select a block N when the video output process 250 is currently displaying content from block N−1. (Step 5010).

If playback has just begun and the buffer has not yet been filled with the minimum volume of stream-two blocks (step 5020) or the second stream was started ahead of the first stream and playback has not reached the starting point of the second stream, the block selector 245 can select the next block N from the first stream and make this block available to the video output process 250. (Step 5030).

If the network service is normal (step 5040), in one configuration the block selector will default to selecting the block N from the first stream. However, if stream-one block N is not available then the block selector will draw the stream-two block N from the buffer 240 instead. (Step 5050). A stream-one block N might not be available, for example, if a higher quality second stream block N was already stored in the buffer at the time the first streaming process evaluated the need to download block N. (FIG. 3, step 3050). In an embodiment, after a block N is selected and provided to the video output process, any buffered second stream block N remaining in the buffer can be deleted. (Step 5060). The block selection process then returns to a wait state until another block needs to be selected for playback. (Step 5010). This normal network service methodology is a subset of the degraded network service discussed below and so block selection during normal and degraded service conditions can be managed in the same manner.

If network service is degraded (step 5070), the first stream bitrate may have been decreased and lower quality stream-one blocks received. A corresponding higher quality stream-two block might already have been received and buffered. Block selector selects the stream-one or stream-two block N that has the highest quality (step 5080). If a first stream block N is not available, the second stream block N will be chosen. The selected block is made available to the video output process 250. (Step 5090). Stream-two block N can (if present) can then be deleted from the buffer. (Step 5060). The process then returns to a wait state until another block needs to be selected for playback. (Step 5010). As will be appreciated, if the network connection is compromised, a particular block N from second stream might be retrieved from the buffer for playback while first stream is still waiting to receive the stream-one block N. In such a case, block selector 245 can signal the first streaming process 230 that its requested block N is no longer needed. In response the first streaming process can abort that request and move to a later block in the stream.

If there is a service interruption (step 5100) it can initially be treated the same as a service degradation wherein the block selector 245 will pick the best available block N from stream-one (if any are available) or from a buffered stream-two block (step 5110) and make that block available to the output module (step 5120). Once stream-one blocks are exhausted, which likely occur quickly since stream-one is likely configured to request only one block ahead, the block selector 245 can continue to draw blocks from the second stream buffer as long as they are available. As long as there are buffered stream-two blocks available (step 5130), the system will able to continue to draw stream-two blocks from the stream buffer 240 until the buffer is exhausted. As noted, the buffer 240 may have enough advance stream-two blocks stored to permit video playback to continue during the interrupt period for 1, 2, or 5 minutes or more beyond the point reached by stream-one. Assuming that buffered stream-two blocks remain, the system will return to a wait state until another block needs to be selected for playback (step 5110). If there is no stream-one block and no stream-two blocks are available for playback (step 5130), the second stream buffer has been exhausted. At that point, the video playback is paused until service is restored and streaming reinitiated (step 5140).

During a service interruption, the system will continue to try and reinitiate the streaming processes during playback of buffered blocks. When a network connection is reestablished, stream one can be restarted at the next block after the one currently being played. Stream two can be restarted at the last available buffered stream-two block plus 1. If no buffered blocks are available, stream two can be restarted according to the same behavior used at the start of streaming but adjusted to reflect the current playback point.

Accordingly, after a startup period and once the block selector 230 is actively choosing between stream-one and stream-two blocks, each of streaming process 230, 235 stream can operate largely independently to request blocks at an appropriate bit rate. The first streaming process 230 requests blocks of the best quality that can be sustained based on available resources but only if there is not the same sequence number stream-two block of a higher quality already buffered. The second streaming process 235 will continue to request blocks in advance of the current playback position and make an effort to maintain the configured interval. If the interval cannot be maintained at a given quality rate, then second streaming process 235 can reduce the quality of blocks that it requests, if possible, in order to stay ahead of playback by the specified interval.

Software to implement embodiments of the invention can be structured in various ways. In a particular embodiment, first streaming process 230, second streaming process 235, and block selector process 245 can be implemented as separately operating program tasks that are each be running in parallel to each other. Alternatively, the two streaming processes can be implemented within a single software module that itself can be separate from or further combined with the block selector process 245.

The methods and systems disclosed herein can be used as an extension of any supported block streaming protocol and is preferably implemented using a VBR adaptive streaming protocol. Suitable streaming media protocols include Apple HLS, Microsoft Smooth Streaming, MPEG-DASH, Adobe HTTP dynamic streaming, RTSP/RTP. While VBR streaming protocols are preferred, alternative embodiments of the invention can be implemented using a streaming protocol that is not adaptive to available bandwidth, such as a protocol that allows selection of a bitrate at the start of streaming but does not permit switching during playback. In this implementation, the first stream can be started at a higher bitrate than the second stream. However, even if the first and second streams are operating at the same bit rate, the second streaming process can still stream ahead of the first stream if the available bandwidth allows stream-two blocks to be requested faster than the block playback rate.

The improved streaming player system 215 be implemented as a web browser plug-in that supplements existing (conventional) streaming media player software. The software can be downloaded by a user and installed on their device. The invention can also be implemented as part of stand-alone video streaming software, such as an app that can be loaded on a tablet or cell phone, and that can be used to retrieve videos from a variety of sources or limited to accessing media from one or more designated media content providers. In a further implementation, the invention can be included as part of a media player library and accessible via appropriate APIs called from separate program. Computer code to configure a computing system to implement the invention can be stored on a computer program product for physical or electronic distribution.

An improved player according to various aspects of the inventions can provide an improved playback experience in any streaming system where the resources available to the video player, such as available network bandwidth or CPU resources, can vary. A common environment is one where the computing device is connected to the streaming source over a wireless link and the data bandwidth of this RF connection varies as the computing device is moved around. However, even with a hardwired network interface, reductions in overall data throughput between the computing device and the video server can occur due to intervening network congestion. In addition, the video player application may be executed on the computing device as a low priority process whereby resources, such as access to available bandwidth for data download or access to CPU cycles for data decoding, is restricted when other higher priority tasks are run.

The methodology disclosed herein is discussed in the context of video streaming applications. However, methods and systems according to aspects of the disclosed inventions may also find beneficial use in the streaming of other segmented data files which are played-back or otherwise accessed prior to downloading of an entire file and where the data connection may suffer from bandwidth degradation or cutouts.

Aspects of the invention have been disclosed and described herein. However, other various modifications, additions and alterations may be made by one skilled in the art without departing from the spirit and scope of the invention as defined in the appended claims.

What is claimed is:

1. A method for reducing dropouts during video stream playback of video content, the method implemented on a computing device connected to a server from which the video content can be retrieved, the video content comprising a plurality of sequentially ordered blocks containing video data for a plurality of video frames wherein each block has a respective sequence number representing each respective block's position in the sequential order, the method comprising the steps of:

initiating a first streaming process to provide a first stream of blocks of the video content to the computing device, blocks requested by the first streaming process and received at the computing device being stream-one blocks;

initiating a second streaming process to provide a second stream of blocks of the video content to the computing device, blocks requested by the second streaming process received at the computing device being stream-two blocks, the second stream providing stream-two blocks of the video content to the computing device, the second streaming process operating substantially concurrently with the first streaming process and configured to obtain stream-two blocks having sequence numbers that are further in the sequential order than a sequence number of a most recently received stream-one block and to store received stream-two blocks in a buffer;

determining the availability at the computing device of a complete stream-one block N and the availability of a buffered stream-two block N;

selecting as a playback block N having sequence number N a buffered stream-two block N in response to a determination that a complete stream-one block N is unavailable at the computing device at a time of selection;

selecting at the time of selection the playback block N having sequence number N from one of the stream-one block N and the buffered stream-two block N based on predefined selection criteria in response to a determination that both the stream-one block N and the buffered stream-one block N are available at the computing device at the time of selection;

processing the selected playback block N to provide a video output signal for presentation of the video content on a display.

2. The method of claim 1, wherein the video content is encoded in a plurality of layers with each respective layer encoded at a different bit rate, each respective sequence number of the video content having a corresponding block in each of the layers, the first streaming process and the second streaming process are adaptive streaming processes operative to request blocks from the server at respective variable bit rates Q1 and Q2, the method further comprising the steps of:

the first streaming process requesting blocks from the server at selected bit rate Q1;

periodically adjusting the value of Q1;

the second stream requesting blocks from the server at selected bit rate Q2;

periodically adjusting the value of Q2 in a manner dependent on a difference between the largest sequence number of the stream-two blocks in the buffer and the sequence number of the most recently received stream-one block;

the predefined selection criteria comprising selecting the respective block encoded at the highest bit rate.

3. The method of claim 2, further comprising the steps of:

determining that a particular next block X having sequence number X should be retrieved from the server by the first streaming process;

prior to the first streaming process requesting the block X, setting Q1 to a selected bit rate dependent on at least one resource presently available to the first streaming process;

the first streaming process requesting from the server the block X at bit rate Q1 only if the buffer does not contain a stream-two block X of bit rate greater than or equal to Q1.

4. The method of claim 3, further comprising the steps of:

receiving stream-one block X; and deleting any stream-two block X in the buffer after the stream-one block X been received.

5. The method of claim 2, further comprising the step of setting Q2 to an initial value less than an initial value of Q1.

6. The method of claim 2, the step of periodically adjusting the value of Q2 comprising the steps of:

determining a difference between a largest sequence number of the buffered stream-two blocks and the sequence number of the most recently received stream-one block;

increasing Q2 to a higher bit rate in response to a first predefined condition being met, the first predefined condition being dependent on whether the difference exceeds a threshold value;

decreasing Q2 to a lower bit rate in response to a second predefined condition is being met, the second predefined condition being dependent on whether the difference is less than a minimum value.

7. The method of claim 6, wherein the threshold value and minimum value are the same.

8. The method of claim 2, further comprising the step of the second streaming process suspending requests for blocks from the server during a period when a difference between a largest sequence number of the buffered stream-two blocks and the sequence number of the most recently received stream-one block exceeds a maximum value.

9. The method of claim 2, wherein the at least one resource available to the first streaming process includes a bandwidth that is allocated between the first streaming process and the second streaming process.

10. The method of claim 9, wherein the bandwidth allocation to the second streaming process is less than or equal to 50% of a combined total bandwidth available to the first streaming process and the second streaming process.

11. The method of claim 1, further comprising the step of the first streaming process aborting an outstanding request for a block N in response to the buffered stream-two block N being selected as the playback block N.

12. The method of claim 1, wherein the first streaming process starts the first stream at a first sequence number and the second streaming process starts the second stream at a second sequence number larger than the first sequence number.

13. A system for reducing dropouts during video stream playback of video content, the video content being available from a server and comprising a plurality of sequentially ordered blocks, each block containing video data for a plurality of video frames and having a respective sequence number representing each block's position in the sequential order, the system comprising:

a computing device comprising a processor, a memory, a display, and a data interface suitable for exchanging data with a server from which video content can be retrieved;

the memory having stored therein computer-executable instructions that, when executed by the processors, configure the system to:

initiate a first streaming process to request the video content from the server and provide a first stream of the video content, blocks requested by the first streaming process and received at the computing device being stream-one blocks;

initiate a second streaming process for operation substantially concurrently with the first streaming process and to request the video content from the server and provide a second stream of the video content, blocks requested by the second streaming process and received at the computing device being stream-two blocks, the second streaming process operating to request from the server video content blocks having sequence numbers that are further in the sequential order than a most recently received stream one-block and to store received stream-two blocks in a buffer;

select a playback block N having sequence number N from one of (i) a buffered stream-two block N if a complete stream-one block N is not available at the computing device at a time of selection, and (ii) one of the stream-one block N and the buffered stream-two block N based on predefined selection criteria if both are available;

process the playback block N to provide a video output signal for presentation of streamed video content on a display; and show the streamed video content on the display.

14. The system of claim 13, the video content being encoded in a plurality of layers each encoded at a different bit rate, each respective sequence number of the video content having a corresponding block in each of the layers;

the first streaming process configured to request blocks from the server at selected bit rate Q1 and to periodically adjust the value of Q1 in accordance with at least one resource available to the first streaming process;

the second streaming process configured to request blocks from the server at selected bit rate Q2 and to periodically adjust the value of Q2 in accordance with a difference between a largest sequence number of stream-two blocks in the buffer and the sequence number of the most recently received stream-one block.

15. The system of claim 14, the computer-executable instructions further configuring the system to:

determine that a particular next block X having sequence number X should be retrieved from the server by the first streaming process;

prior to the first streaming process requesting the block X, set Q1 to a maximum bit rate according to at least one resource presently available to the first streaming process;

request from the server the next block X at bit rate Q1 for stream-one only if the buffer does not contain a stream-two block X of bit rate greater than or equal to Q1.

16. The system of claim 14, the computer-executable instructions further configuring the system to delete from the buffer any stream-two block X after the stream-one block X has been received.

17. The system of claim 15, wherein the at least one resource available to the first streaming process comprises a bandwidth allocated between the first streaming process and the second streaming process.

18. The system of claim 17, wherein the bandwidth allocation to the second streaming process is less than or equal to 50% or less of a combined total bandwidth available to the first streaming process and the second streaming process.

19. The system of claim 14, the computer-executable instructions further configuring the system to set Q2 to an initial value less than an initial value of Q1.

20. The system of claim 14, the computer-executable instructions further configuring the system to:

determine a difference between a largest sequence number of the buffered stream-two blocks and the sequence number of the most recently received stream-one block;

increase Q2 to a higher bit rate if the difference exceeds a threshold value;

decrease Q2 to a lower bit rate if the difference is less than a minimum value.

21. The system of claim 14, the computer-executable instructions further configuring the system to cause the second streaming process to suspend requests for blocks from the server during a period when a difference between a largest sequence number of the buffered stream-two blocks and the sequence number of the most recently received stream-one block exceeds a maximum value.

22. The system of claim 13, the computer-executable instructions further configuring the system to abort an outstanding request for a stream-one block N in response to the buffered stream-two block N being selected as the playback block N.

23. The system of claim 13, the computer-executable instructions further configuring the first streaming process to start the first stream at a first sequence number and the second streaming process to start the second stream at a second sequence number larger than the first sequence number.

24. A method for playing a streamed video on a computing device, the computing device being connected to a server from which the video content can be retrieved, the video content being available in a plurality of different layers, each layer comprising an encoding of the video content at a particular bit rate and comprising a plurality of sequentially ordered blocks, wherein each block has a respective sequence number representing each block's position in the sequential order and each block contains encoded video data for a plurality of video frames, the method implemented on the computing device and comprising the steps of:

initiating a first streaming process to request the video content from the server and provide a first stream of the video content, blocks requested by the first streaming process and received at the computing device being stream-one blocks, the first streaming process starting at an initial bit rate setting Q1 wherein Q1 indicates the bitrate layer of video content from which blocks are requested from the server by the first streaming process;

initiating a second streaming process to provide a second stream of the video content, blocks requested by the second streaming process and received at the computing device being stream-two blocks, the second streaming process starting at an initial bit rate setting Q2 that is less than Q1, Q2 indicating the bitrate layer of video content from which blocks are requested from the server by the second streaming process;

storing at least some of the stream-two blocks in a buffer;

initiating a block selection process to select playback blocks;

providing selected playback blocks to a video output process operative to display video contained in selected playback blocks;

the method further comprising the steps of:

in the first streaming process:

(a) adjusting a bit rate value Q1 to in accordance with resources available to the first streaming process;
(b) requesting from the server block X at sequence number X and bit rate Q1 if the buffer does not contain a stream-two block X of bit rate greater than or equal to Q1; and
(c) repeating first streaming process steps of (a) adjusting and (b) requesting for a next sequence number block X+1;

in the second streaming process:
(d) requesting from the server block Y at sequence number Y with bit rate Q2;
(e) upon receipt of stream-two block Y at the computing device, adding stream-two block Y to the buffer;
(f) determining whether a Q2 value adjustment condition is present based on a difference between Y and a current block sequence number of the first streaming process;
(g) in response to a positive Q2 value adjustment condition adjusting Q2 by one of increasing Q2 to a higher bit rate when a first predefined condition is met and decreasing Q2 to a lower bit rate in response to a determination that a second predefined condition is met, wherein the first predefined condition is dependent on whether the difference exceeds a threshold value and the second predefined condition is dependent on whether the difference is less than a minimum value; and
(h) repeating the second streaming process steps (d), (e), (f) and (g) for a next sequence number Y+1 when the difference does not exceed a maximum value;

in the block selection process, in response to an indication that a particular block with sequence number P is needed for playback:
(i) selecting as the playback block P a buffered stream-two block P if a stream-one block P has not been obtained by the first streaming process; otherwise selecting the respective stream-one block P and stream-two block P having the highest bit rate as the playback block P; and
(j) deleting a stream-two block P from the buffer if present.

* * * * *

UNITED STATES PATENT AND TRADEMARK OFFICE
CERTIFICATE OF CORRECTION

PATENT NO. : 10,779,017 B2  
APPLICATION NO. : 16/214921  
DATED : September 15, 2020  
INVENTOR(S) : Tom Stratton et al.

It is certified that error appears in the above-identified patent and that said Letters Patent is hereby corrected as shown below:

In the Claims

Column 11, Line 35, replace "stream-one block" with -- stream-two block --.
Column 12, Line 25, replace "is being met" with -- being met --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*